US011224246B2

(12) United States Patent
Mittal et al.

(10) Patent No.: US 11,224,246 B2
(45) Date of Patent: Jan. 18, 2022

(54) MINERAL FORTIFICATION PROCESS AND ITS USES

(71) Applicant: SOCIETE DES PRODUITS NESTLE S.A., Vevey (CH)

(72) Inventors: Vikas Ashok Mittal, Hamilton (NZ); Ashling Ellis, Hamilton (NZ); Shantanu Das, Hamilton (NZ); Aiqian Ye, Hamilton (NZ); Harjinder Singh, Hamilton (NZ)

(73) Assignee: Societe des Produits Nestle S.A., Vevey (CH)

( * ) Notice: Subject to any disclaimer, the term of this patent is extended or adjusted under 35 U.S.C. 154(b) by 92 days.

(21) Appl. No.: 15/679,909

(22) Filed: Aug. 17, 2017

(65) Prior Publication Data

US 2017/0339996 A1    Nov. 30, 2017

Related U.S. Application Data

(63) Continuation of application No. 14/409,196, filed as application No. PCT/NZ2013/000109 on Jun. 20, 2013, now abandoned.

(30) Foreign Application Priority Data

Jun. 20, 2012 (NZ) ........................ 600756

(51) Int. Cl.
| | | |
|---|---|---|
| *A23L 33/165* | (2016.01) | |
| *A23L 33/19* | (2016.01) | |
| *A23J 3/10* | (2006.01) | |
| *A23C 9/146* | (2006.01) | |
| *A23C 9/152* | (2006.01) | |

(52) U.S. Cl.
CPC ............ *A23L 33/165* (2016.08); *A23C 9/146* (2013.01); *A23C 9/1522* (2013.01); *A23C 9/1526* (2013.01); *A23J 3/10* (2013.01); *A23L 33/19* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 4,213,896 A * | 7/1980 | Davis | A23C 9/1307 426/657 |
| 5,833,953 A | 11/1998 | Berrocal et al. | |
| 6,119,509 A * | 9/2000 | Pakes | G01N 33/04 73/54.02 |

(Continued)

FOREIGN PATENT DOCUMENTS

| | | |
|---|---|---|
| GB | 1034124 | 4/1964 |
| JP | 08-242773 | 9/1996 |

(Continued)

OTHER PUBLICATIONS

Bonifacio: EP0939083A2; published Sep. 1, 1999. (Year: 1999).*

(Continued)

*Primary Examiner* — Patricia A George
(74) *Attorney, Agent, or Firm* — K&L Gates LLP

(57) ABSTRACT

A non-micellar mineral-protein complex including an exogenously added mineral and a protein, where the mineral-protein complex is soluble in a solution at a physiological pH between 6.6 to 6.9 and the complex includes exogenous phosphorus.

19 Claims, 10 Drawing Sheets

(56) References Cited

U.S. PATENT DOCUMENTS

| | | | |
|---|---|---|---|
| 6,124,258 A * | 9/2000 | Sakurai | A61K 38/1709 514/13.5 |
| 6,150,547 A | 11/2000 | Sakurai et al. | |
| 6,998,143 B1 | 2/2006 | Sher et al. | |
| 2003/0165597 A1 | 9/2003 | Augustin et al. | |
| 2008/0299285 A1 | 12/2008 | Klotz et al. | |
| 2008/0312423 A1 | 12/2008 | Palmano et al. | |
| 2011/0003032 A1 | 1/2011 | Harnett et al. | |
| 2015/0164123 A1 * | 6/2015 | Mittal | A23C 9/1522 426/74 |

FOREIGN PATENT DOCUMENTS

| | | |
|---|---|---|
| NZ | 332994 | 8/1999 |
| WO | 0051446 A1 | 9/2000 |
| WO | 2009047087 A1 | 4/2009 |

OTHER PUBLICATIONS

Guinee: WO2009150183; published Dec. 17, 2009. (Year: 2009).*
M. Sugiarto et al., "Milk protein-iron complexes: Inhibition of Lipid Oxidation in an Emulsion", Dairy Science Technology, vol. 90, 2010, pp. 87-98.
D. Carmichael et al., "Effect of Milk and Casein on the Absorption of Supplemental Iron in the Mouse and Chick", The American Journal of Clinical Nutrition, vol. 28, May 1975, pp. 487-493.

* cited by examiner

Figure 2

Sodium/Potassium, Ammonium Caseinate/Lactic casein

↓

Dissolving and mixing in water at 50°C for 30 min (3.0%) w/w)

↓

Chilling the solution to 2°C

↓

Addition of $K_2HPO_4$ salt solution

↓ pH adjustment to pH 6.8 (5°C) using 0.5 M HCL (optional)

↓

Addition of 0.5M $FeCl_3.6H_2O$ with process pH maintained between 6.7 -6.9

↓

Additional volume adjustment with water if required

↓

Stirring for 30 min at 2 – 10 °C

↓

Clarification

↓

Concentration and Spray Drying

Effect of iron addition on the level of soluble protein in a sodium caseinate solution (2% protein) containing (●) 0 mg/kg, (o) 500 mg/kg, (▼) 1000 mg/kg and (Δ) 2000 mg/kg of phosphorus. Samples were centrifuged at 500 x g for 10 min at 20°C.

Effect on iron additional on the levels of soluble iron in a sodium caseinate solution (2% protein) containing (●) 0 mg/kg, (o) 500 mg/kg, (▼) 1000 mg/kg and (Δ) 2000 mg/kg of phosphorus. Samples were centrifuged at 500 x g for 10 min at 20°C.

Effect of iron addition on the turbidity of sodium caseinate solution (2% protein) containing (•) 0 mg/kg , (o) 500 mg/kg, (▼) 1000 mg/kg and (Δ) 2000 mg/kg of phosphorus.

Figure 3: Interaction of various combinations of sodium caseinate, iron and phosphorus (A) 2.5% sodium caseinate and 20mM $FeCl_3$ (B) 2.5% sodium caseinate, 20mM $FeCl_3$ and 1500 mg $K_2HPO_4$ (complex 2)(C) 20mM $FeCl_3$ and 1500 mg $K_2HPO_4$

Figure 7
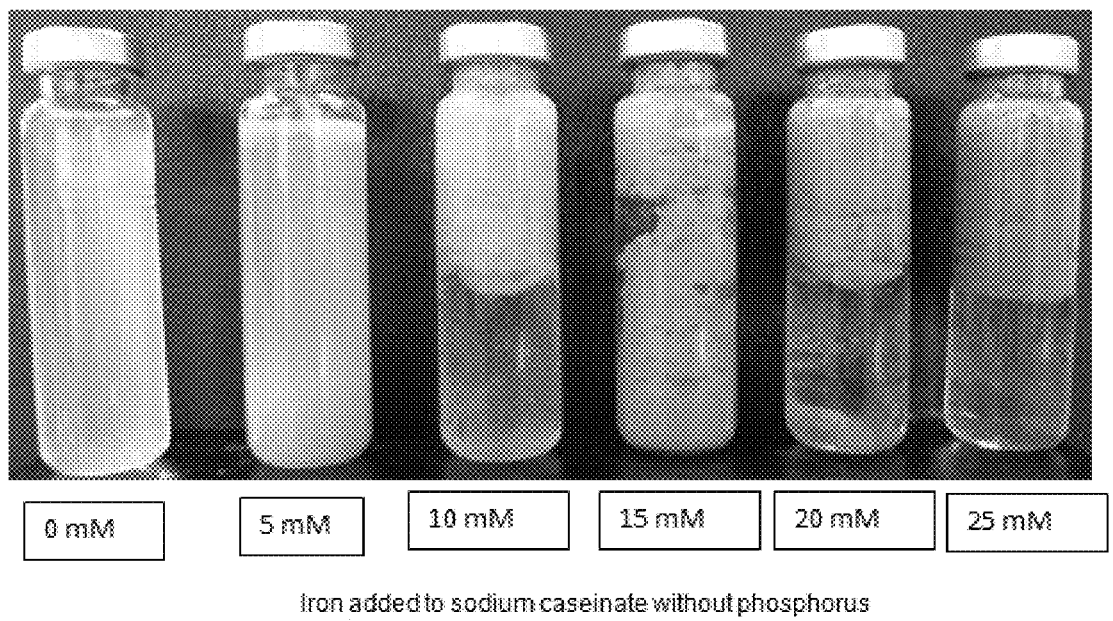
Iron added to sodium caseinate without phosphorus
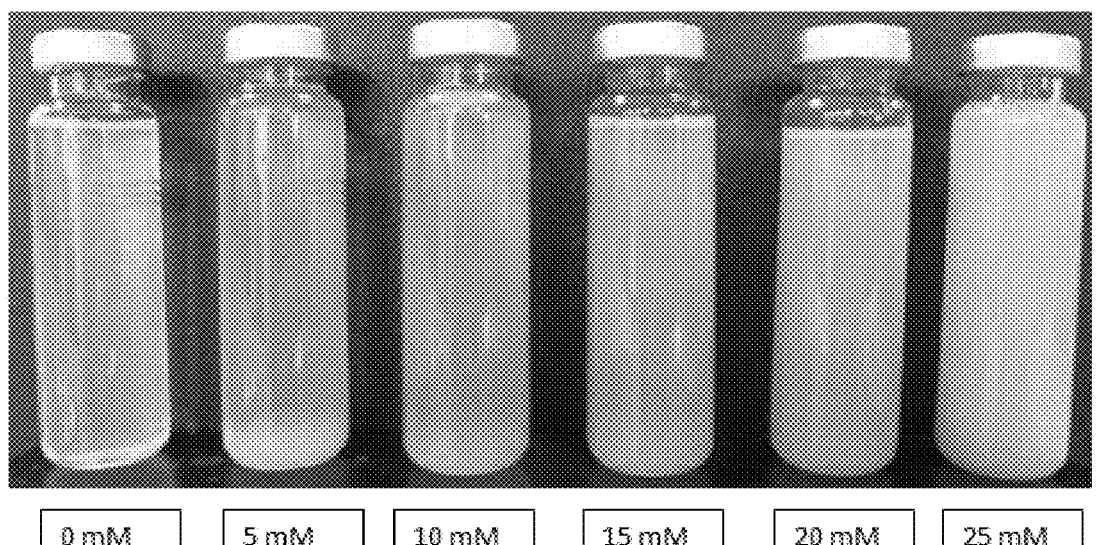
Iron added to sodium caseinate using with 2000 mg/kg phosphorus Solubilisation of iron-protein complex upon ultracentrifugation (100,000 x g, 1hr at 20°C)

Effect of exogeneous phosphorus addition on soluble protein (●), iron (■) and Z-average diameter values (◊) of 30 mM Fe added 70% Ca depleted milk

MINERAL FORTIFICATION PROCESS AND ITS USES

CROSS-REFERENCE TO RELATED APPLICATIONS

This application is a continuation of and claims priority to U.S. patent application Ser. No. 14/409,196 filed on Dec. 18, 2014, which is a 371 application of and claims priority to PCT Application No. PCT/NZ2013/000109 filed on Jun. 20, 2013, which claims priority to New Zealand Patent Application No. 600756 filed on Jun. 20, 2012, the entire contents of which are all incorporated herein by reference.

TECHNICAL FIELD

The present invention relates to mineral-protein complexes and their uses as fortificants.

BACKGROUND

Essential metals (otherwise known as 'minerals' in nutrition science) iron, zinc, copper, manganese, magnesium, selenium, chromium are needed for many body functions, and are required by the body in sufficient quantities to meet its demands in order to maintain optimum health. These minerals are found in varying levels in different foods according to the source (i.e. magnesium from cereal products, iron and zinc from red animal muscle tissue, etc.) and production location (i.e. high or low selenium soils) of that product. Economic, religious and ethical constraints, or simple personal food preferences, may result in certain populations or individuals consuming a diet that does not provide adequate levels of certain essential minerals for optimum health.

Fortification technologies provide opportunities to add an essential mineral(s) to products that would not usually be significant sources of the mineral(s). This means that a wider range of food products can contribute to the total dietary intake of the mineral(s), and thus provides consumers with alternative means of achieving the intakes required for optimum health. However, it can be technologically challenging to add minerals to foods, especially minerals that tend to readily interact with other food components, such as iron. This is particularly difficult in liquid food formats, where processing steps such as heating are involved. At present, fortifying foods or beverages with a physiologically-relevant level of bioavailable iron without the development of undesirable taste (metallic) and appearance (colour changes which can occur either during processing or storage) is a significant challenge.

The natural forms of iron in the diet are haem and non-haem. Haem iron is a constituent of haemoglobin, the molecule that is responsible for carrying oxygen in the blood of most animals. For this reason, it is solely of animal origin, and is found in significant levels in meats such as beef, lamb and pork. It is highly bioavailable, due to its solubility in the alkaline conditions of the duodenum and jejunum (West and Oates, 2008), which allows it to be readily absorbed by the body. However, despite its high bioavailability, its animal origin presents difficulties for vegetarian and vegan populations.

Non-haem iron is naturally found in plant sources in either the ferrous or ferric form, and has a lower bioavailability due to low solubility at intestinal pH. The ferrous form of iron can be easily oxidized to its ferric state in the presence of oxygen, as is commonly encountered under processing conditions. Ferric salts of iron are precipitated as ferric hydroxide at pH >3, making them unavailable for absorption in the duodenum (Conrad and Umbreit, 2002).

The general dilemma in iron fortification of liquid and semi-solid foods (especially milk and dairy products) has been the issue of product stability. Traditional fortificants like ferrous sulphate or elemental iron are not suitable for the mass iron fortification of a range of food products due to lack of physico-chemical compatibility. Nutritional programmes involving iron fortification, that target young children and women, have attempted to fortify milk and dairy products due to their high nutritional value.

However, the reactivity of soluble (bioavailable) iron sources with constituents in liquid milk (caseins, fat and calcium in milk) has been shown to decrease the bioavailability of Fe both in vitro and in vivo studies in the past (Edmondson, 1971). Reactivity of the iron sources also can translate into unpalatable products which is a further disadvantage. This reason has been the main deterrent in using milk as a vehicle for iron fortification.

The general consensus is that greater bioavailability is found in iron ingredients which have increased solubility at the duodenal pH (6.6-6.9). Compounds like ferric pyrophosphate, which are poorly soluble, have been used for fortification of dried milk and dairy products. However, its reported bioavailability is highly variable (Hurrell, 2002).

Chelated forms of iron have emerged as a convenient choice, as they are soluble at a physiological pH and are therefore available for absorption within the body. As the iron is bound to a ligand, it is prevented from interacting with other compounds present in the food matrix. However, despite their benefits from a functional and bioavailability perspective, chelates such as sodium ferredetate and ferrous bisglycinate are not presently used as a mass fortificant because of their reactivity at high temperatures (especially in the presence of polyphenols), as well as a high cost of raw materials.

An alternative that has been explored is to chelate iron with protein, such as casein, which is naturally present in milk. However, earlier commercial and research applications of binding iron to milk proteins (e.g. WO 2000/51446) have not been successful because of the formation of insoluble precipitates at higher levels of iron addition (>8 mM). The levels of iron loading in this earlier patent was therefore unable to exceed 1% of the dried powder, which represents a ratio of casein to iron in the powder of approximately 92:1 assuming the protein content to be 92% of the said powder. Such products cannot be applied to beverages like milk, fruit juices etc. because they could generate haze when added to transparent beverages and solutions.

In another example Raouche and co-workers added 20 mM iron (3.62% of milk protein Dry Matter (DM) basis) to milk at chilling temperatures, wherein the iron was bound to the caseins in micellar form. More than 90% of the added iron was bound to the caseins in the colloidal phase of milk. However, when milk with added iron was heated at 90° C. for 10 min precipitates were observed (Raouche et al., 2009).

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

SUMMARY

In the broadest aspect, the present invention relates to the provision of improved mineral protein complexes. Advantages of the complexes formed may include an improved solubility and heat stability, ease and lowered costs in their manufacturing, and wider applications in food, beverage and therapeutic products.

The advantages of the mineral protein complexes, methods of manufacture and uses described herein will become more apparent with the ensuing description. Two embodiments of the present invention are outlined below under the Headings "Complex I" and "Complex II". It should be appreciated that the preferred embodiments of each complex may be utilised by the other complex, and vice versa.

In the following disclosure the contents of calcium, iron and phosphorus have been described as ratios with respect to the protein content in the samples. To further clarify; in the case of normal cow milk there is a concentration of 32 g protein, 1000 mg phosphorus and 1200 mg of calcium per litre of milk, which will achieve a ratio of 26:1 (protein:calcium) and 32:1 (protein:phosphorus) respectively. A reduction in the calcium content will increase this ratio (protein/calcium), while an increase in the phosphorus will decrease this ratio (protein:phosphorus). Milk contains negligible amounts of iron and the external addition of iron is represented in terms of protein:iron ratio. Understandably, an increase in the concentration of iron will decrease the ratio of protein:iron.

Wherever low calcium is said it means a protein/calcium ratio in milk or sources of milk protein with protein/calcium ratio greater than 58:1 or a casein/calcium ratio greater than 45:1 (cow milk contains 32 g protein in which casein constitutes 25 g in 1 litre of milk).

Complex I

According to one aspect of the present invention there is provided a mineral-protein complex, the complex including
a) a mineral component; and
b) a protein
characterised in that the protein is derived from a milk source and wherein the milk source has a ratio of protein to calcium equal to or above 45:1 and wherein the mineral-protein complex includes over 1% w/w bound mineral.

According to a further aspect of the present invention there is provided a method of manufacturing a mineral-protein complex as discussed above,
the method characterised by the step of:
a. adding a mineral to a milk source with a ratio of protein to calcium equal to or above 45:1 such that the mineral-protein complex includes over 1% of bound mineral.

Advantages of Complex I

The inventors found that by using a milk source with a low level of calcium for example, as outlined in FIG. 1, an improved fortification complex may be obtained compared to the prior art, particularly with regards to heat stability of the complex and the ability to load equal or higher amounts of the mineral whilst retaining stability and bioavailability.

It should be emphasised that the present invention may utilise a milk source with a low level of calcium which has been already provided, or may result from processing to remove calcium from a milk source. There are well-known techniques available to remove calcium from a milk source, such as ion exchange process, membrane processes, their combination and the like.

Without wishing to be bound by theory, the inventors consider the significant advantages of the present invention are arising because the calcium, which normally binds with high affinity to the milk proteins, is being removed thus opening up binding sites for a mineral(s) to bind to the milk proteins. Therefore, it is possible that the ability to bind higher amounts of mineral(s) without certain disadvantages such as precipitation, for example, may be possible.

To provide an example using the method as described herein, the inventors were able to achieve an optimum ratio of protein/iron of 19.5:1 (equating to about 5.1% w/w loading of iron to protein in complex I), although higher levels of iron loading were also able to be achieved. Additionally, the complex was found to be stable in a soluble form at these ratios and mineral loading, and it is considered this stability and higher loadings will be beneficial for inclusion in food and beverage products.

This is a significant improvement over loading of iron and stability as reported in WO 2000/5144, namely only 1% w/w iron loading in final powder (expected protein/iron ratio 92:1). In the current process, the inventors were able to achieve an optimum protein/iron 19.5:1 and still provide a very stable product, unlike as reported in Raouche et al, 2009. This improvement in the higher loading of the mineral and stability of the complex is thought to be attributed to the reduced calcium levels in the complex.

The invention may help to overcome problems associated with fortification of milk products including precipitation of protein, decreased stability particularly at the high temperatures experienced with processing of liquid and semi-solid food products and limitations to the amount of mineral that can be added during the fortification process. Furthermore, the preparation of these soluble mixes may enable iron fortification to liquid beverages, without affecting the shelf stability of liquid beverages.

Additionally, the present method results in a complex which is soluble at physiological pH, unlike many of the prior art documents. In the past when ferric iron has been bound to casein through a precipitation process, it has been found that the bioavailability of the iron from such complexes is similar to that of ferrous sulphate (Zhang and Mahoney, 1989, Kim et al., 1995), which is considered to have very good bioavailability for a non-haem iron source. Given the nature of the present invention is similar in terms of the binding of a mineral to casein, it is expected to demonstrate bioavailability of a similar level.

A further advantage of this method is that it may use inherently available proteins in milk (such as casein). This may help to reduce manufacturing time and resources needed and so forth.

A further advantage of this process (and its resulting complex) is that the methods which may be used to remove calcium have no substantial effect on other constituents in the milk, which are left substantially unchanged. Again, this helps to keep the end product closer to the original milk composition.

Preferred Embodiments of Complex I

Throughout this specification the term milk source should be taken as meaning whole milk or a component thereof sourced from a lactating animal.

Preferably, the lactating animal is a mammal. This is because, as will be outlined further below, all mammals have casein (a particularly preferred protein) in their milk.

Preferably, the milk source is from cow's milk. Alternatively, the milk source could be from human, sheep, buffalo, goat or another mammal that has relatively high levels of casein in the milk source or mixtures thereof. For example, casein makes up approximately 80% of proteins in cow's milk and buffalo milk, and about 20-50% of the proteins in human milk.

Throughout this specification the term protein should be taken as meaning any polypeptide molecule that has been either synthetically or naturally derived.

Throughout this specification, the phrase "low level of calcium" should be taken as meaning a protein/calcium ratio greater than that in normal milk. Normal milk has approximately 1200 mg of calcium constituting a protein/calcium ratio of 26.6:1.

Therefore, the protein/calcium ratio in the milk source is equal to or above 45:1, and this clearly constitutes a low level of calcium compared to what is present in normal milk.

Preferably, the protein/calcium ratio in the milk source is greater than 58:1. More preferably, the protein/calcium ratio in the milk source is approximately between 58:1 and 640:1.

In this embodiment the protein/calcium ratio is, preferably between 70:1 to 95:1, as an example 83:1.

This represents a significant decrease (approximately a decrease of 70%) of calcium present in the milk compared to milk which has not had calcium removed.

More preferably, at least 50% of the calcium is removed from the milk source.

Most preferably, approximately 70% of the calcium (w/v) has been removed from the milk source.

The inventors identified that removing 70% of the calcium from milk may be sufficient to solubilise more than 95% of the colloidal milk proteins (e.g. casein micelles). This improved the heat stability and physico-chemical properties of the milk proteins favouring the soluble complex formation.

Throughout this specification, the term mineral should be considered any mineral which may be of physiological benefit to an animal (such as a human) and may be delivered to an animal via the fortified mineral-protein complex. For example, typical minerals of physiological value considered most applicable to the present invention include those such as calcium, sodium, potassium, iron, zinc, copper, manganese, selenium or chromium.

In the context of the present invention (for both complex I and II), it should be understood that the fortification process relies on addition of at least one exogenous mineral. In agreement with the general understanding in the industry, and within the context of the present invention, the term exogenous should be understood to mean that the mineral is externally added and is not provided endogenously by the protein. It should also be understood that within the mineral-protein complex, an amount of endogenous mineral may also be present. To provide an example, endogenous calcium may still be bound to the casein. Yet in addition, the protein complex may be fortified with exogenously added iron.

Preferably, the mineral is iron.

The preference to fortify the complex with iron comes back to the clear need to provide soluble inexpensive fortified iron complexes and to address the problems as outlined previously. However, the inventors acknowledge that the present concept may be used to fortify a complex with other minerals beyond iron, such as zinc, copper, manganese, selenium or chromium. Potentially inadequate intakes of these minerals in animals present opportunities to utilise the present invention in a similar mechanism. One skilled in the art would appreciate other minerals may be substituted for iron and also bind to many proteins to form a complex.

Preferably, the iron is ferric and/or ferrous salts of iron. For example, ferric chloride may be used. Alternative ferric iron sources such as ferric sulphate pentahydrate, ferric phosphate, ferric pyrophosphate, etc. may be used without departing from the scope of the invention. Ferric iron will bind more efficiently to caseins than ferrous iron owing to the binding characteristics of their respective iron oxidation states.

However, it should not be ruled out that ferrous iron may be used in the present invention.

Preferably, the protein from the milk source is selected from caseins, whey proteins and their individual fractions or mixtures of the same.

More preferably, the protein is casein.

A protein of particular interest is casein, which is inherently present in milk. In US 2003/0206939, it is outlined how various micronutrient components (e.g. minerals, enzymes, vitamins) which have affinity to casein proteins as a result of positive and negative groups along the length of the casein polypeptide chain.

Although casein represents a particularly preferred protein to be used in the present invention (either naturally or synthetically derived), it should be understood that many other proteins from a milk source may be used with Complex I.

It is known that casein binds calcium from milk to form colloidal casein micelles.

The inventors have identified that an advantage of removing calcium from milk is it may help to break down the casein micelle structure and thus allow solubilisation of individual caseins which become available to bind to the mineral (e.g. iron) once added.

There are many well-known techniques available to remove calcium from a milk source. On the other hand, many have tried to fortify milk with micronutrient components such as iron (GAUCHERON, F. 2000. Iron fortification in dairy industry. *Trends in Food Science & Technology*, 11, 403-409.). However, until now it has not been thought to actually combine these two principles to arrive at a significantly improved complex.

The mineral-protein complex includes above 1% w/w bound mineral.

More preferably, the mineral-protein complex includes between 1% to 20% w/w bound mineral.

Even more preferably, the mineral-protein complex includes between 4 to 8% w/w bound mineral.

For both Complex I and II (discussed further below), the resulting complex was found to be very stable and soluble, and most likely will portray significantly improved functionality when incorporated into food and beverage products than the prior art complexes. Therefore, providing fortified complexes with higher loading of minerals such as iron (even at 1% w/w) represents a significant improvement over the prior art.

Also, these embodiments regarding % w/w of mineral bound reflect that although amounts lower than 1% w/w may be beneficial in some circumstances, a higher concentration of bound mineral may be much more commercially and physiologically useful.

There is a balance to be optimised with higher mineral fortification of the complex and ensuring stability of the complex. Indeed, the inventors have exemplified binding of 7% w/w loading (see Examples 3-5 with loading of 25 mM iron) while still ensuring the complex remains stable. It is quite possible that concentrations of up to 20% w/w mineral bound to the complex may be achieved. It should be understood that, depending on the application of the mineral-protein complex, different amounts of mineral bound to the complex may be developed for use. The inventors foresee that a 4% w/w loading of mineral is most applicable towards various commercial uses, such as in milk powder fortified with iron.

Preferably, the mineral-protein complex includes additional phosphorus. The normal ratio of protein to phosphorus in milk is 32:1.

Preferably, the protein complex includes an amount of phosphorus which may decrease this ratio of protein:phosphorus to 8:1, or 6.25:1 for casein:phosphorus.

Below the above ratio, the inventors believe precipitation of proteins along with iron and phosphorus may occur.

A discussion of the advantages of adding phosphorus (and proposed mode of action) is outlined further in the next section. Any phosphorus containing food grade compound may be used with the present invention. However, one such example is $K_2HPO_4$.

Preferably, the complex of the present invention is used as a food additive or ingredient within a nutritional beverage product, food product, therapeutic/pharmaceutical composition or animal feed composition.

Preferred Method of Manufacture of Complex I

A particularly preferred method of manufacture of Complex I is shown schematically in FIG. 1.

Preferably, the milk source is a milk in liquid form inclusive of whole milk, skimmed milk, low lactose milk, ultrafiltration retentate concentrated milk and or mixtures thereof.

Alternatively, the milk source is one from powder form.

Types of milk powder which may be used include milk protein concentrate powder (MPC), calcium depleted MPC powder, whole milk powder, skim milk powder (SMP) (or lactose reduced SMP), or phosphocaseinate powder. The protein concentration of the resulting milk source solution may vary from 1-12.5%.

Preferably, the milk is stirred, or in case of powder source is then dissolved, in an amount of water and mixed at a temperature between 2-95° C. Most preferably, the temperature is between 2-10° C., for reasons which will become apparent later.

The mixing step may last about 30 minutes.

After mixing, calcium may be removed if necessary to provide the low level of calcium as required.

One may start with a low-level calcium milk source, or may prepare such from a milk source initially with normal levels of calcium, as discussed further below.

Preferably, the method includes removing the calcium from the milk source using ion exchange.

In the ion exchange process, $Na^+$, $K^+$ or $H^+$ form of resin may be used individually or in a mixed form. A strong acidic cation exchange resin, or a mixture of strong and weak forms may be used. Most preferably, the resin is a weakly acidic cation exchange resin of $K^+$ form.

An advantage of ion exchange is that removal of calcium by this process may help to result in minimum alteration in the quantities of minerals present in milk other than calcium. This may play an important role in the creation of soluble complexes.

Preferably, the amount of resin used is 0.1-80% w/v.

More preferably, the amount of resin used is 0.1 to 50% w/v.

Preferably, the method includes reducing the amount of calcium in the milk source to a protein/calcium ratio to be greater than 58:1.

More preferably, the method includes reducing the amount of calcium in the milk source to a protein to Ca ratio of approximately 106:1.

Preferably, the method includes removing the amount of calcium in the milk source by at least 50% w/w and up to 100% w/w of the calcium from the milk source. Most preferably, the method includes removing the amount of calcium in the milk source to about 70% of the initial quantity.

Calcium removal may be monitored through a number of ways. One such example is a titration method using Patton Reeder reagent (Patton and Reeder, 1956).

To stop the ion exchange process, ion exchange resins in contact with milk may be removed via clarification. A wide variety of steps may be used to stop the ion exchange process, including centrifugation and filtration. Other methods may be used without departing from the scope of the present invention.

Preferably, the pH is maintained between 6.0 to 8.5 using at least one pH regulator.

More preferably, the pH is maintained at approximately 6.5 to 7.5.

The pH may need to be adjusted between 6.5 and 7.5 after ion exchange due to the change in calcium levels. To increase and decrease the pH, a pH regulator such as sodium hydroxide or hydrochloric acid or like, respectively, may be used.

Additionally certain minerals which may be added, such as ferric chloride, are highly acidic.

These may precipitate the proteins if they are added to the milk protein. Therefore, maintaining this preferred pH will therefore help to prevent precipitation of proteins from the solution.

Unlike the prior art, the present invention allows inexpensive ferric compounds to be used and be soluble at a pH well above 3. Therefore, the present invention provides a soluble iron-protein complex which may be advantageously retained at a physiological pH (6.5-7.5) which renders the complex to be available for absorption within the body. The process could also be performed anywhere between pH 8.5 and 6.3 with similar results.

Preferably, the calcium is removed whilst retaining the temperature between approximately 2-10° C.

Maintaining the temperature within this range has a number of advantages. It helps to prevent bacterial growth, and helps to control the rate of ion exchange. Also, β-casein, a major casein in milk, exists as a monomer at these temperatures. Therefore, this temperature may help to release the calcium from the micelles during the ion exchange process. Calcium phosphate is more soluble at lower temperature which may aid in ion exchange.

In the case of adding minerals such as iron, removing lactose may allow increasing the concentration of mineral in the complex.

A decrease in the ratio of protein:iron may be achieved by addition of phosphorus source such that the above ratio decreased from 28:1 (without phosphorus addition) to 19.5:1 (with phosphorus addition of 1000 mg/litre of milk), with further improvements expected.

As discussed previously, a protein:iron ratio of 28:1 equates to approximately 5.1% w/w binding of iron to the protein.

Preferably, the method includes an optional step of phosphorus addition to the low calcium milk source. In one embodiment, the phosphorus containing compound is an orthophosphate like $K_2HPO_4$. However alternative compounds are clearly envisaged, as discussed further in this specification (Complex II).

Preferably, additional phosphorus is added to the milk source solution.

More preferably, phosphorus is added to the milk source to provide a protein:phosphorus ratio between 64:1 to 8:1.

The inventor found this level of phosphorus was beneficial to improve increased iron (or other mineral) loading and complex solubilisation.

Most preferably this protein:phosphorus ratio is approximately between 32:1 to 8:1.

In the embodiment where iron-protein complexes are to be formed, the method includes slowly adding an iron containing compound to the calcium depleted milk source. One such iron containing compound is $FeCl_3.6H2O$. A solution such as 0.01 to 0.5 M $FeCl_3.6H2O$ may be used for this process.

Minerals, such as ferric chloride, which may be added to form the fortified complex may be highly acidic. Subsequently, alterations in the milk pH may precipitate the proteins if they are added to the milk source. Therefore, maintaining a preferred pH between 5.8 to 10.5 (preferably 6.5 to 7.5) may help to prevent precipitation of proteins from the solution.

Preferably, the temperature is maintained between 2-8° C. when the mineral (e.g. iron) is added. This again helps to maintain the protein (e.g. casein) as monomers to promote complex formation with the mineral.

Once the mineral is added, the resulting solution may be mixed for a period of time such as 30 minutes at between 2-8° C. This mixing may help to promote complex formation.

The solution may be clarified to remove precipitated or unwanted matter. The solution may be formulated into a powder by concentration and any suitable drying process, such as spray drying. Powder forms of the complex are considered to be particularly useful to increase shelf life compared to keeping the complex stored as a solution. Furthermore, powders may be more easily handled and are versatile when used for the addition to food/beverage and/or pharmaceutical purposes.

It should be appreciated that the complex may instead be kept as a solution until further use.

Complex II

According to a further aspect of the present invention there is provided a mineral-protein complex including an exogenously added mineral and a protein, wherein the mineral-protein complex is soluble in a solution at a physiological pH between 6.6 and 6.9 characterised in that the complex includes exogenous phosphorus.

According to a further aspect of the present invention there is provided a method of manufacturing a mineral-protein complex as discussed above, wherein the method is characterised by the steps of
a. adding exogenous phosphorus to a protein; and
b. adding an exogenous mineral to the protein to form the complex.

Summary of Advantages of Complex II

After developing the invention and advantages of Complex I, the inventors then devised an alternative embodiment as provided in Complex II which provided a range of different advantages and very positive results.

Similar to the advantages of Complex I, the method of preparing Complex II is relatively easy and cost effective compared to prior art techniques. However, as there is no need to remove calcium from milk, the present method may present an even simpler process than that of Complex I. This is primarily because the process may utilise proteins such as sodium caseinate which are purchased or otherwise provided for in a pre-purified state.

Compared to the prior art, Complex II is a significantly improved mineral fortification complex as it is again highly soluble and is not prone to precipitation or aggregation. These are important advantages as they allow for easier storage and use for various commercial products. Similar to Complex I, Complex II is stable at physiological pH, unlike many of the prior art complexes.

Furthermore, a higher concentration of mineral bound to casein may be achieved in the final powder e.g. final ingredient could contain 8% by wt of iron, and again these preliminary results are expected to be improved upon. This is a major improvement to prior art complexes which report loading of only 1% w/w iron in powder form (protein/iron 92:1).

A higher concentration of mineral such as iron allows the complex to be used for a wide variety of uses. For instance, it may allow a greater dose of iron in a lower volume/mass of a food product.

Many other advantages of these complexes are listed and discussed within this specification.

Complex II relies on the addition of exogenous phosphorus to the protein to be used for forming the complex. For simplicity, we again refer primarily to casein as the protein. However, it should be understood that other proteins may be used with the present invention without departing from the scope thereof.

The inventors identified that the added phosphorus plays an important role in the formation of these stable, soluble complexes. Without wishing to be bound by theory, it is thought that phosphorus may act by increasing the surface charge on the complex thereby preventing the aggregation and consequent precipitation of the protein.

Caseins are known to be mineral chelators, which bind minerals such as iron mainly through the coordination complexes formed between the mineral and oxygen of the clusters of phosphoserine residues available throughout the structure of caseins. However, binding of iron to these caseins results in a decrease in the surface charge, thereby causing aggregation and precipitation of proteins. It may be possible that phosphorus acts by increasing these surface charges through mechanisms still unknown thereby preventing the aggregation of proteins.

Furthermore, the preferred process of making both complex I and II is conducted at temperatures of about 2-10° C. where proteins such as casein exist partly as monomers due to absence of hydrophobic interactions at such temperatures. The existence of casein in the monomeric form might further provide binding sites for minerals such as iron thereby increasing the amount of minerals that could be bound to caseins.

These results could not have been logically predicted. This is because in past studies when phosphorus and calcium have been added to sodium caseinate, it had caused precipitation of the protein. Therefore, one skilled in the art would have assumed that upon on addition of iron in place of calcium, substantial precipitation and/or loss of stability would also have occurred.

Preferred Features of Complex II

Preferably, the protein is a phosphoprotein.

Preferably, the phosphoprotein is casein.

However, the inventors acknowledge that other proteins such as egg phophovitin have similarities to casein which suggest a comparable level of binding and stabilisation would occur following phosphorylation of the protein.

Other proteins such as soy protein, cereal protein and algal protein may also be used, albeit potentially with varied levels of phosphorylation and/or binding to produce a soluble and stable iron protein complex.

Preferably, the casein containing compound is sodium caseinate, potassium caseinate, ammonium caseinate, lactic casein and/or derivatives or fractions of caseins.

Preferably, the mineral is iron. Preferably, the iron is ferric iron. For example, ferric chloride may be used. Alternative ferric iron salts such as ferric sulphate pentahydrate, may be used without departing from the scope of the invention. Similarly, a ferrous iron source may be used. The preference to fortify the complex with iron comes back to the clear need to provide soluble inexpensive fortified iron complexes.

However, the inventors acknowledge that the present invention may be used to fortify a complex with other minerals beyond iron, such as zinc, manganese, selenium or chromium. Requirements for all these minerals in animals present opportunities to utilise the present invention in a similar mechanism. One skilled in the art would appreciate other minerals, or mixtures of minerals, may be substituted for iron.

Preferably, the mineral-protein complex includes above 1% w/w mineral bound to protein.

More preferably, the mineral-protein complex includes between 1% to 20% w/w mineral bound to protein.

Even more preferably, the mineral-protein complex includes between 1 to 9% w/w mineral bound to protein.

The advantages of these loadings of mineral have been previously discussed in relation to Complex I, and the same reasoning applies for Complex II.

It should be appreciated that in the case of casein for example, $\alpha_{s1}$, $\alpha_{s2}$ and β caseins are highly phosphorylated, whereas other variants of casein such as K-casein are sparsely phosphorylated. The phosphorylation patterns of casein subtypes are well documented, for example as outlined on page 1 of US 2003/0206939, which is herein incorporated by reference. This is also the case for many other proteins which may be used according to the present invention.

Preferred Method of Manufacture of Complex II

A particularly preferred method of manufacture of Complex II is shown schematically in FIG. 2.

The method is discussed more generally below.

Preferably, the protein used is a casein containing compound.

Preferably, the casein containing compound used in the method is sodium caseinate, potassium caseinate, ammonium caseinate, lactic casein and/or derivatives and fractions of caseins. Such compounds may be readily obtainable from suppliers in a pre-purified state. As discussed previously, this avoids the need for processing or purification steps as used in the preparation of Complex I.

Preferably, the method includes dissolving the protein in water to form a solution. This dissolving step may be performed at a relatively higher temperature such as between 40-60° C. to aid in the dissolving process. Once dissolved, the solution may preferably be chilled to a lower temperature, preferably between 2-10° C. for reasons discussed previously. However, the process may be performed at temperatures between 2-95° C.

Preferably, the protein concentration in the solution is configured to be between 1-12.5% w/v. Most preferably, the protein concentration in the solution is configured to be between 1-5% w/v.

After the protein solution is chilled, this is a convenient point at which phosphorus may then be added to the protein solution.

Most preferably, the phosphorus is added to the protein solution prior to the addition of the mineral. This may help to prime the protein solution for effective binding of the mineral.

The source of phosphorus may be food grade orthophosphate or polyphosphate or linear phosphate salt, as mono, di, trisodium, potassium, ammonium, magnesium or calcium phosphates, as well as phosphoric acid and/or mixtures thereof.

Preferably the source of phosphorus is $K_2HPO_4$. The normal ratio of casein to phosphorus is 65:1. A lower ratio than this is required to achieve the aforementioned benefits.

Preferably, an amount of phosphorus is added to the protein solution such that the ratio of protein to phosphorus is between 5:1 to 30:1. Most preferably, the ratio of protein (e.g. casein) to phosphorus is between 12:1 to 22:1.

Preferably, the mineral is added to the protein solution after the addition of phosphorus.

Preferably, the mineral is iron. However, it has already been emphasised that many other types of minerals may be used in a similar manner to bind to proteins such as casein.

Preferably the iron is ferric iron. One such source of ferric iron is $FeCl_3$, although others are clearly envisioned.

Preferably the ratio of protein to iron (e.g. casein) is between 200:1 to 2:1.

Most preferably, the ratio of protein to iron (e.g. casein) is between 100:1 to 10:1.

As previously discussed, as ferric iron is acidic, it may be appropriate to again adjust pH to within the preferred range using suitable pH regulator(s).

Preferably, the resulting protein solution is mixed for a period of time at 5-10° C. This may help to allow time for the mineral to bind to the protein to form the complex. Again, the preferred temperature is thought to help this binding process.

After this incubation step, the solution may then be clarified to remove unwanted material such as any minor amounts of precipitate.

Similar to as described with Complex I, the solution may then be concentrated and spray dried before further use.

Method of Use

The mineral-protein complex may be added to food and beverage products, or as the base for any product to be consumed orally, in order to provide a source of an essential mineral. This means that animals may get the essential minerals from alternative sources to help reach the intake required for optimum health.

Most preferably, the mineral that is to be provided via the food product is selected from iron, zinc, copper, manganese, magnesium, selenium or chromium.

Outline of Further Advantages of the Present Invention

Liquid milk and food products may be fortified with minerals using the complexes of the present invention. In the case of iron for example, sodium ferredetate and ferrous bisglycinate are available to do this, but it is very expensive to do on a large scale.

Ease of mixing powder of the complexes with food/beverages. A flowable powder with low bulk density will mix better than high density iron fortificants e.g. sodium ferredetate and ferrous bisglycinate.

A wide range of mineral (e.g. iron) fortification in beverages is possible without affecting taste, colour and shelf-life.

Complex I is milk based, and complex II is preferably casein based. This means the complexes may be applicable to standardised dairy foods with no substantial regulatory challenges.

The complexes I and II are soluble at physiological pH (6.6 to 6.9).

Unlike the prior art, the complexes of the present invention advantageously do not undergo substantial aggregation, are not prone to precipitation, are heat stable at up to 90° C. for 30 min or even 140° C. for 5 seconds, are translucent and/or are highly stable. This temperature stability exceeds that achieved by existing products, such as ferrous bisgycinate.

For iron (as an example), a creamish-white coloured powder may be produced by the method of manufacture. This may give a transparent solution at 25% daily requirement levels as listed in example 3

The complexes will not cause changes in pH of milk or other neutral products.

The complexes may be mixed with liquid and powdered food products. Concentrated small batches may be prepared and added to bulk milk without sophisticated mixing equipment.

The manufacturing process of Complex I may be performed continuously from milk.

In an embodiment, a milk or concentrated milk product is provided where the milk or concentrated milk product includes a mineral-protein complex, the complex including a mineral and a milk protein where the milk or concentrated milk product has a ratio of milk protein to calcium equal to or above 45:1, and wherein the mineral-protein complex includes over 1% w/w mineral bound to protein.

In another embodiment, a method of manufacturing a milk or concentrated milk product is provided where the milk or concentrated milk product includes a mineral-protein complex including a mineral and a milk protein, and where the milk or concentrated milk product has a ratio of protein to calcium equal to or above 45:1 and where the mineral-protein complex includes over 1% w/w bound mineral. The method includes adding the mineral to the milk or concentrated milk product.

In a further embodiment, a non-micellar mineral-protein complex is provided and includes an exogenously added mineral and a protein, where the mineral-protein complex is soluble in a solution at a physiological pH between 6.6 to 6.9; and the complex includes exogenous phosphorus.

In another embodiment, a method of manufacturing a mineral-protein complex is provided and includes an exogenously added mineral and a protein, wherein the mineral-protein complex is soluble in a solution at a physiological pH between 6.6 to 6.9. The method includes adding exogenous phosphorus to the protein and adding the exogenous mineral to the protein to form the complex.

BRIEF DESCRIPTION OF DRAWINGS

Further aspects of the present invention will become apparent from the following description which is given by way of example only and with reference to the accompanying drawings in which:

FIG. 2 A preferred method for manufacture of complex II;

FIG. 7 Photograph 2 to illustrate the advantages of complex II;

DETAILED DESCRIPTION

Figure 1:
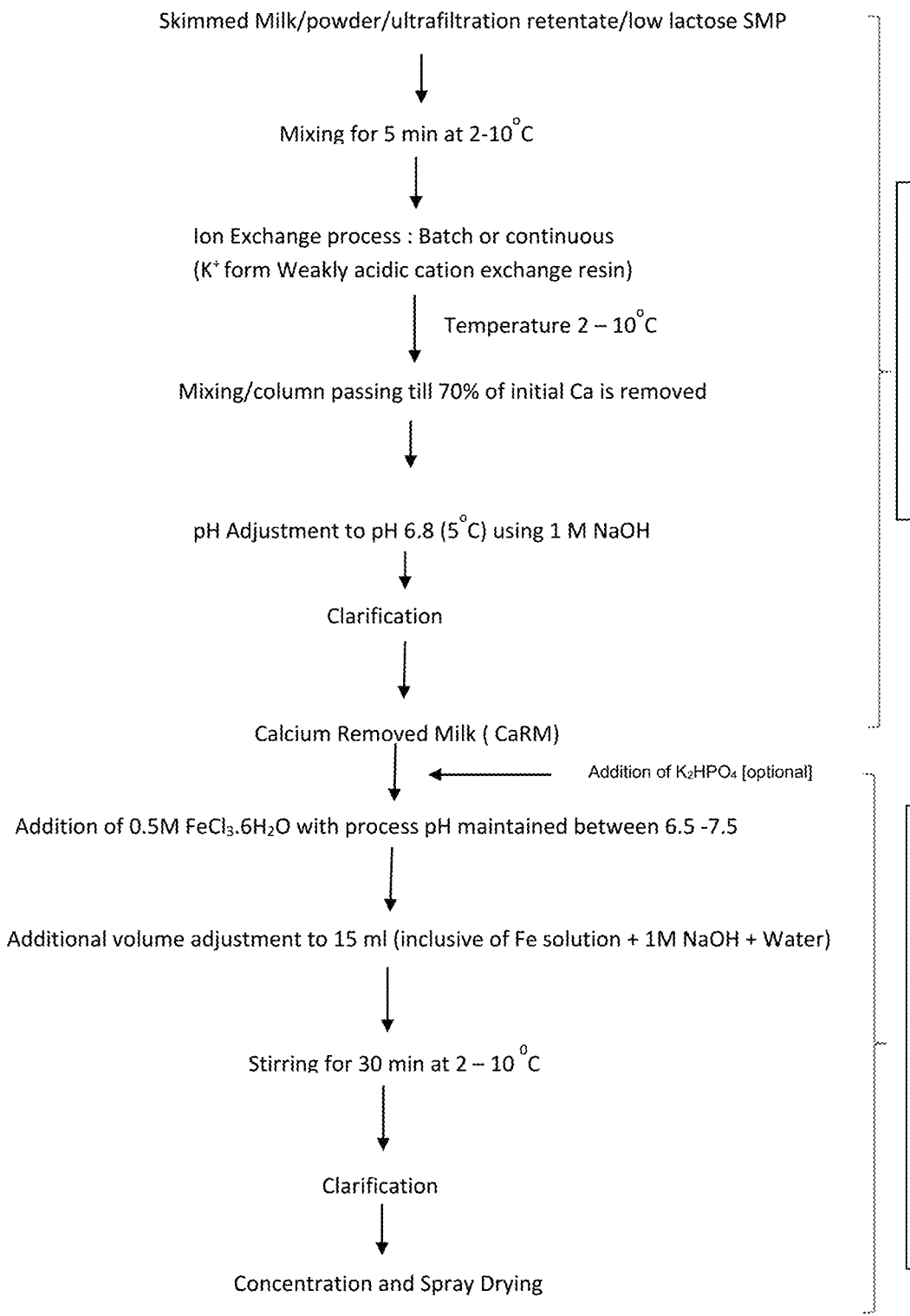
FIG. 1 A preferred method for manufacture of complex I.

Example 1: Physico-Chemical Properties and Composition of 70% Calcium Removed Milk (Used for Complex I)

| Parameters | Specification |
|---|---|
| Colour | Greenish translucent liquid |
| pH | 6.80 |
| Total solids | 10% w/w |
| Viscosity (20° C.) | 1.28 Pascal seconds (50 shear) |
| % Ca removed | 70% w/w |
| Heat stability | Heat Stable (90° C. for 30 min or 140° C. for 5 seconds) |
| Protein | 3.12% w/w |
| Soluble protein | 96% w/w |
| Zeta potential (100 X dilution) | −45.58 |
| Z-avg diameter value | 173 nm |
| Ca | 300-350 mg/kg |
| Mg | 40.7 mg/kg |
| K | 2500 mg/kg |
| P | 940 mg/kg |
| Na | 642 mg/kg |

Example 2: Physico-Chemical Properties and Composition of an Exemplary Soluble Mineral Protein Complex from a Milk-Derived Liquid Source

| Parameters | Specification |
|---|---|
| Colour | Yellowish liquid |
| pH | 6.80 |
| Total solids | 10% w/w |
| Viscosity (20° C.) | 1.33 Pascal seconds (50 shear) |
| % Ca removed | 70% w/w |

-continued

| Parameters | Specification |
|---|---|
| Heat stability | Heat Stable (90° C. for 30 min or 140° C. for 5 seconds) |
| Protein | 3.10% w/w |
| Soluble protein | 93% w/w |
| Zeta potential (100 X dilution) | −48 |
| Z-avg diameter value | 120 nm |
| Ca | 300-350 mg/kg |
| Mg | 40.7 mg/kg |
| Fe | 1675 mg/kg |
| Fe/Protein Ratio % | 3.3% |
| K | 2500 mg/kg |
| P | 2000 mg/kg |
| Na | 1400 mg/kg |

Example 3: Examples to Illustrate the Amount of Each Complex Needed to Achieve Maximum Iron Fortification Levels According to RDI's The table below outlines existing permission for iron fortification in different foods.

| Food | Reference quantity | Maximum claim per reference quantity (% RDI) | Quantity of Iron-protein complex 1 or 2 powder to be added | |
|---|---|---|---|---|
| | | | Complex 1 | Complex 2 |
| Amount of Iron in powder | — | — | 1.8% | 7.5% |
| Biscuits containing not more than 200 g/kg fat & 50 g/kg sugar | 35 g | 3.0 mg (25%) | 166 mg | 40 mg |
| Cereal Flours | 35 g | 3.0 mg (25%) | 166 mg | 40 mg |
| Bread | 50 g | 3.0 mg (25%) | 166 mg | 40 mg |
| Pasta | 35 g uncooked | 3.0 mg (25%) | 166 mg | 40 mg |
| Extracts of meat, vegetables or yeast | 5 g | 1.8 mg (15%) | 100 mg | 24 mg |
| Analogues of meat derived from legumes | 100 g | 3.5 mg (30%) | 194 mg | 100 mg |
| Formulated Beverages | 600 ml | 3.0 mg (25%) | 166 mg | 47 mg |
| Formulated meal replacements | One meal servings | 4.8 mg (40%) | 266 mg | 64 mg |
| Formulated supplementary foods | One serving | 6.0 mg (50%) | 333 mg | 80 mg |
| Formulated supplementary sports foods | One day quantity | 12 mg (100%) | 666 mg | 160 mg |

The recommended daily intake (RDI) for iron is 12 mg.

The table also illustrates the amount of each complex which is required to be added (in powder form) to the food to achieve the maximum iron fortification for each product. This exemplified the versatility of the complexes and their use. It also shows the advantage of being able to load higher amounts of iron into the complexes, as less powder is needed to achieve high iron fortification in the food.

Example 4: Effect of Phosphorus Addition to the Complex

Figure 3:
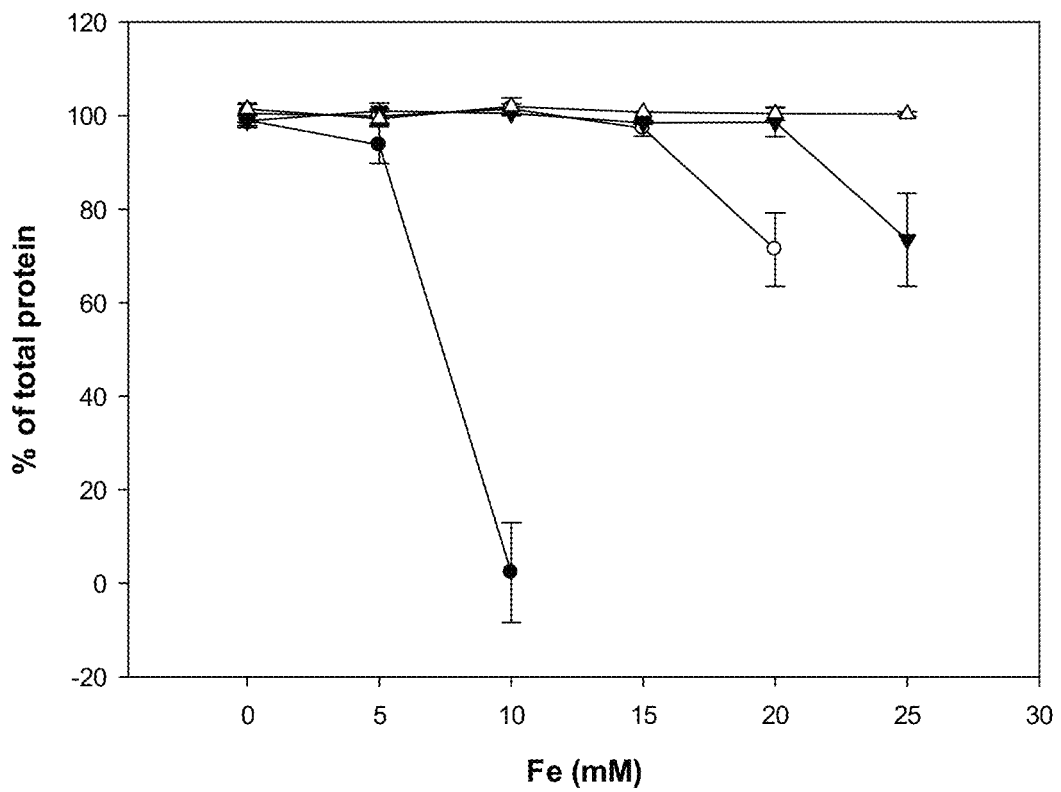
FIG. 3 Effect of iron addition on the levels of soluble protein.
Figure 4:
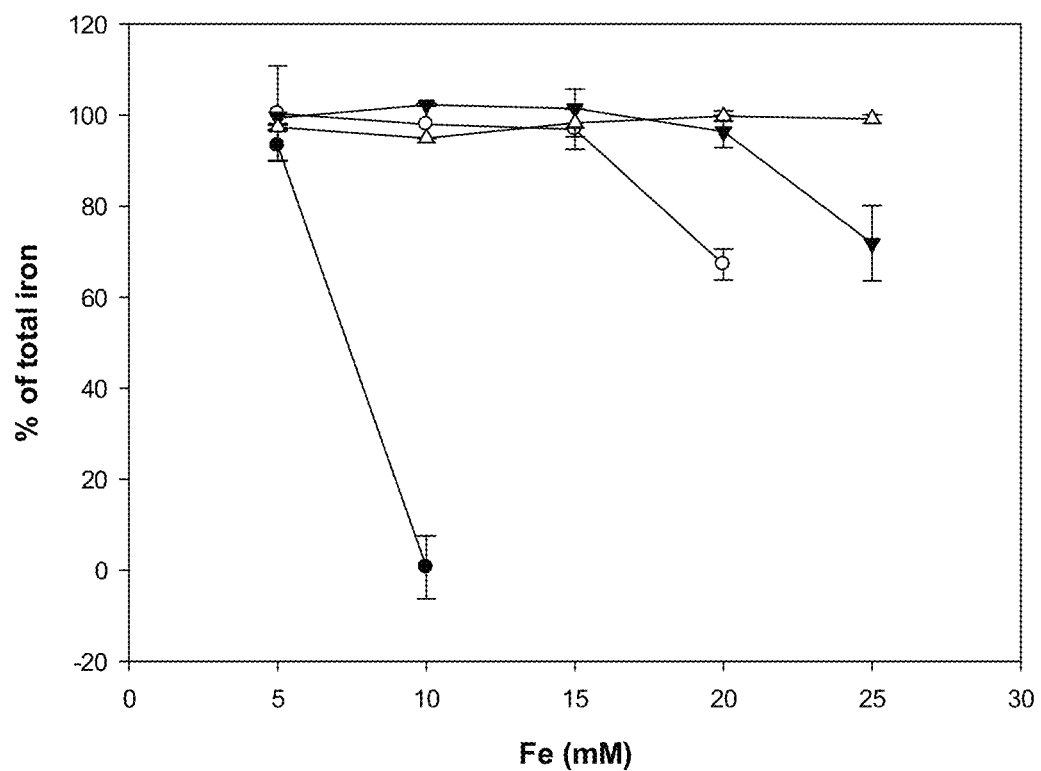
FIG. 4 Effect of iron addition on the levels of soluble iron.
Figure 5:
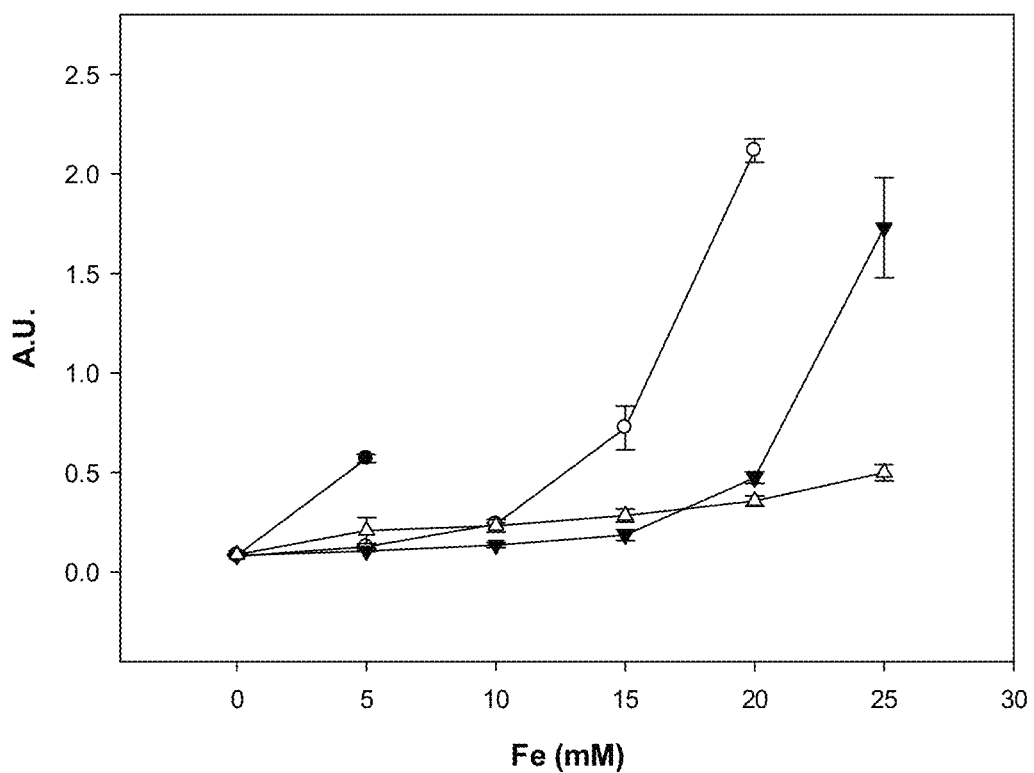
FIG. 5 Effect of iron addition on the turbidity of sodium caseinate solution.

FIGS. 3 to 5 illustrate the effect of adding phosphorus to the complex.

FIG. 3 shows how the protein solubility is affected as iron levels increase from 1 to 20 mM (equivalent to 6.9% iron). As illustrated, as phosphorus levels are increased from 0 mg/kg through to 2000 mg/kg, the protein solubility is significantly improved, regardless of the increase in iron loading.

FIG. 4 similarly shows the effect on solubility of the iron in a sodium caseinate solution. Again, as phosphorus levels are increased, the solubility of iron is improved significantly.

FIG. 5 illustrates the advantages of the invention, wherein an increase in turbidity indicates a reduction in stability due to the formation of small particulates/precipitates. As the amount of phosphorus is increased, the turbidity can be reduced close to baseline even upon loading up to 25 mM (6.9%) iron, indicating that all the protein is remaining in a soluble and stable form.

Based on these preliminary results, the inventors foresee that a particularly optimal level of mineral loading (e.g. iron) may be about 15 mM (4%). This may provide the best balance between stability and loading for many commercial applications. However, increases beyond 15 mM (4%) are clearly possible and may be viable for particular applications as discussed in Example 3 above.

Figure 6:
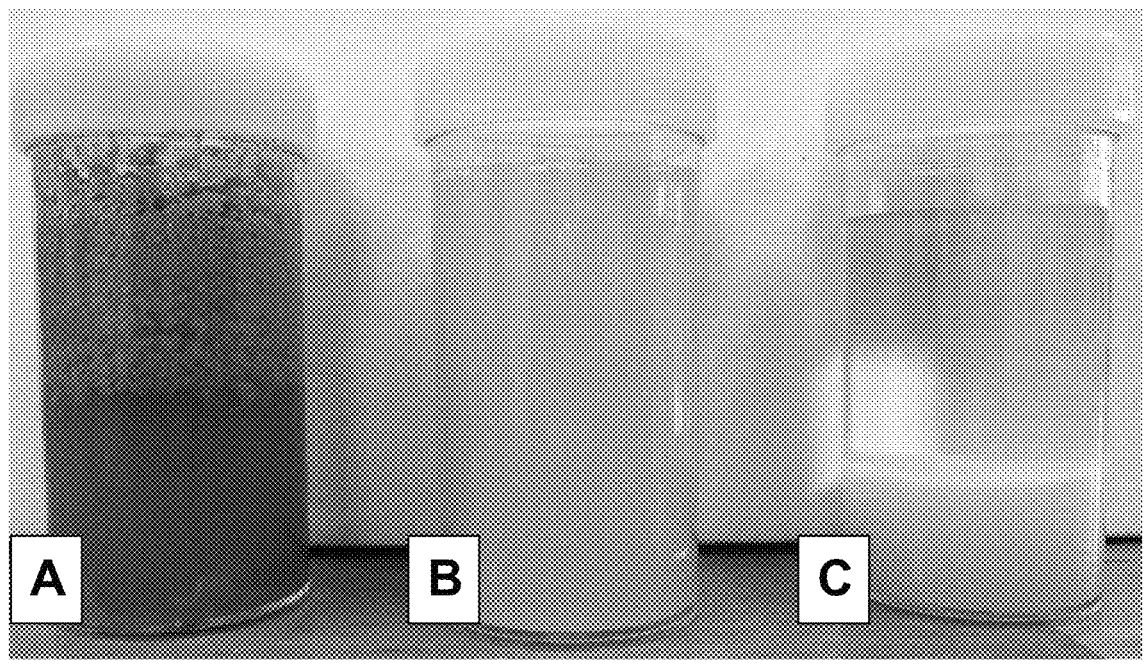
FIG. 6 Photograph 1 to illustrate the advantages of complex II.
Figure 8:
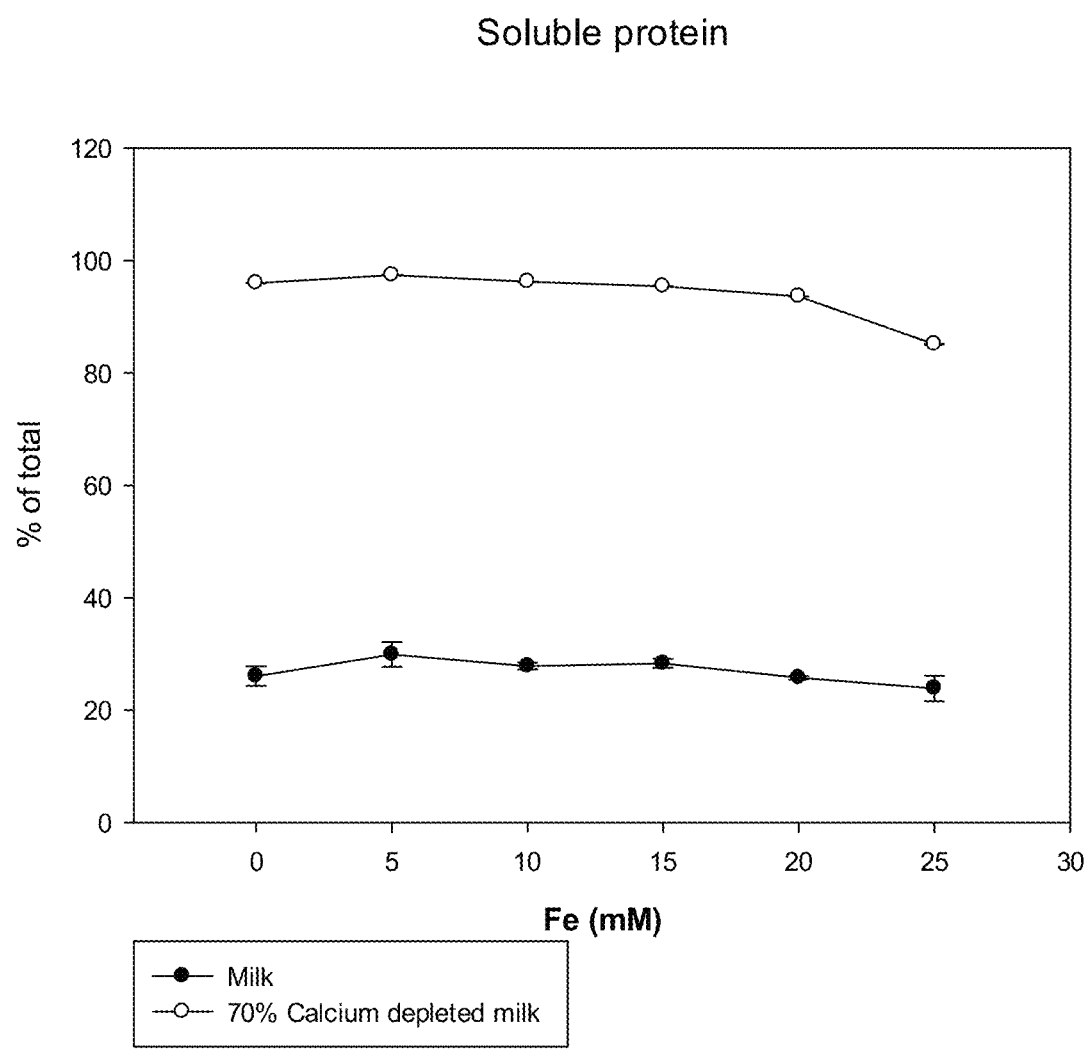
FIG. 8 Effect on protein solubility upon iron fortification using complex I.
Figure 9:
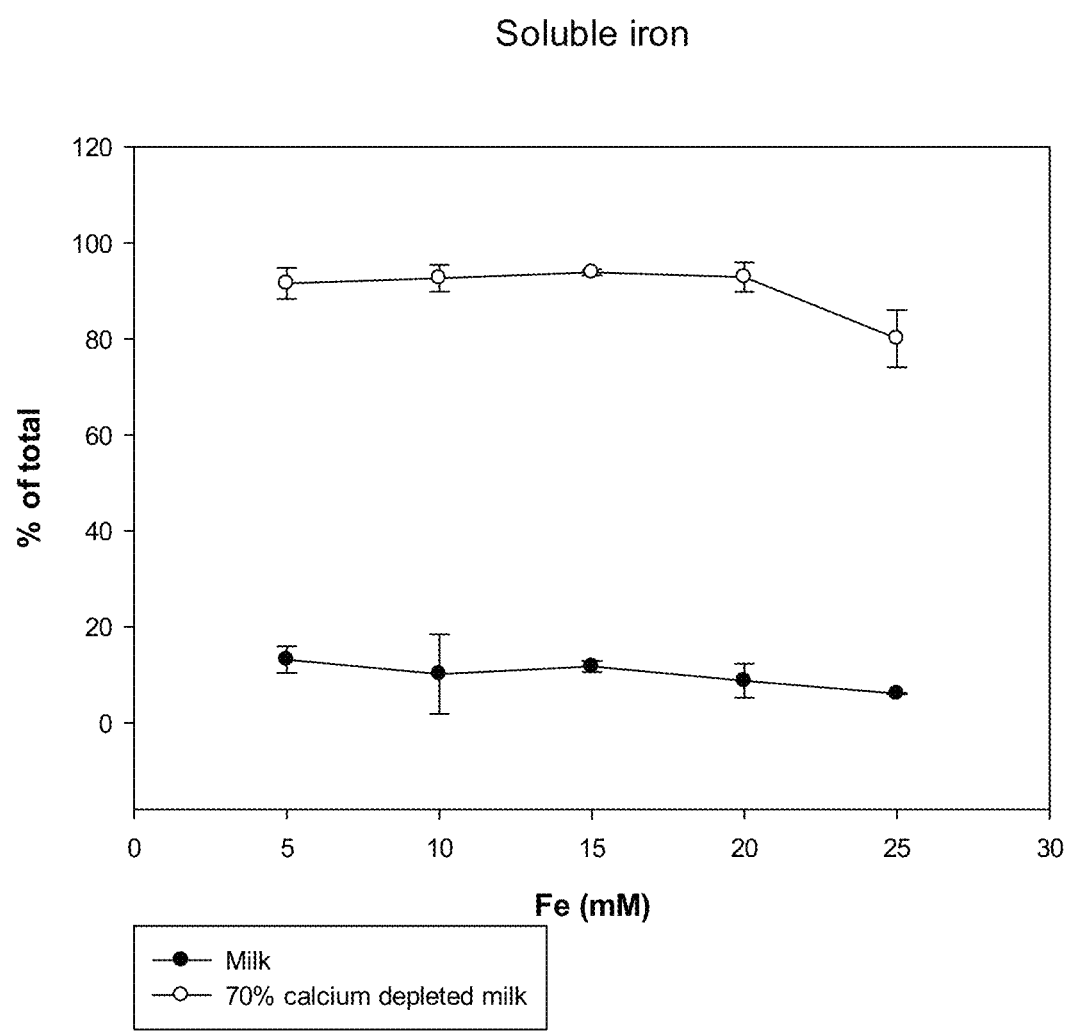
FIG. 9 Effect on iron solubility upon iron fortification using complex I.
Figure 10:
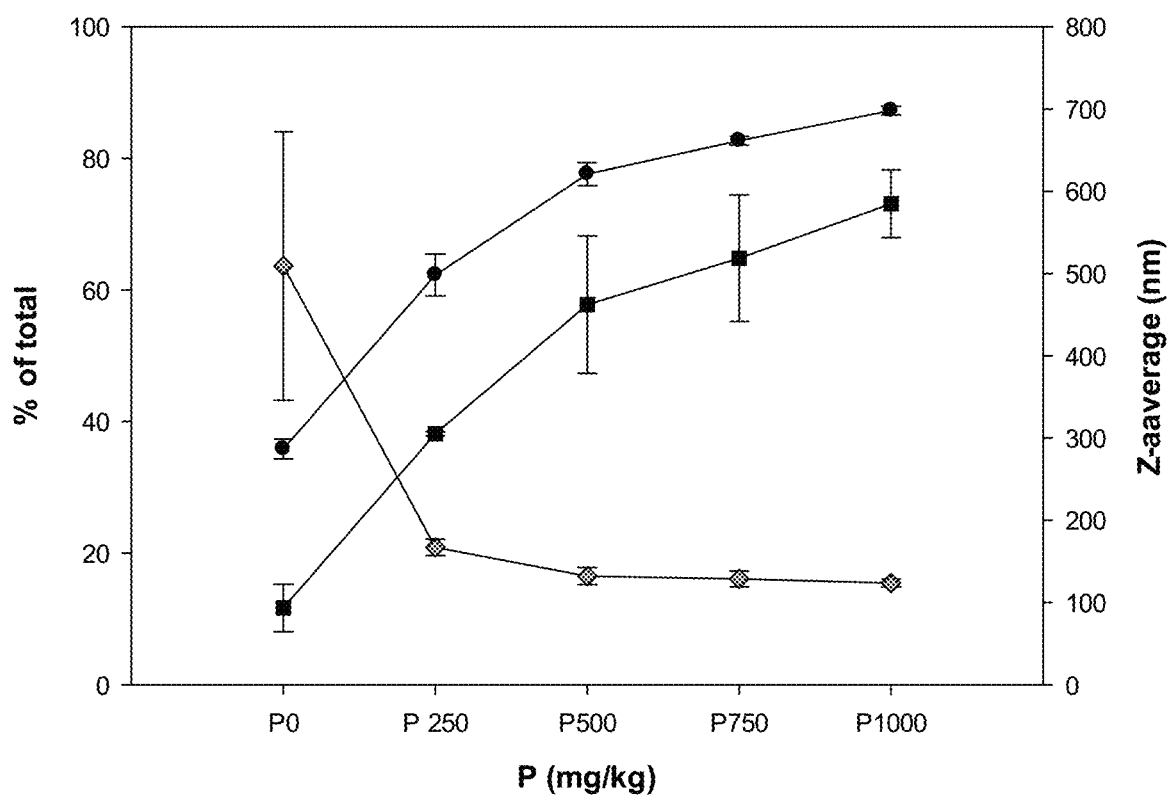
FIG. 10 Effect of protein solubility upon exogeneous phosphorus addition.

Example 5: Visual Representation of Effect of Phosphorus Addition to Sodium Caseinate FIGS. 6 and 7 visually illustrate how addition of phosphorus improves the solubility and stability of the complex. Even when the iron is loaded up to 25 mM, the composition remains in solution. Without the phosphorus, the protein and/or iron precipitates even at lower levels of iron (5-10 mM).

Aspects of the present invention have been described by way of example only and it should be appreciated that modifications and additions may be made thereto without departing from the scope of the appended claims.

Example 6: Testing of Other Minerals

Zinc

We have compared the effect of zinc sulphate addition on the precipitation of proteins in sodium caseinate using our technology.

Upon addition of zinc sulphate to sodium caseinate solution (2% protein), not more than 5 mM of zinc could be added without gross precipitation of proteins at pH 6.8.

However, as exemplified with the concept of complex II, we could add 18 mM of zinc to the sodium caseinate (2% protein solution) without any precipitation of proteins.

Copper

The sodium caseinate solution (2% protein) precipitated upon addition of 1.5 mM copper as copper sulphate. Again using the concept of complex II, we could add 4 mM without noticeable precipitation at pH 6.8.

Example 7: Heat Stability and Sensory Analysis of Complex I

An iron-protein complex according to "Complex I" was added to whole milk powder (WMP) at a level equivalent to 37.5 mg iron per 100 g WMP. This was then reconstituted to 12% solids using water, equivalent to natural milk. This provided a final iron concentration of 4.5 mg per 100 ml serving, equivalent to 25% of the RDA for menstruating women or 56% of the RDA for adult males and postmenopausal women.

The reconstituted WMP was then pasteurized at 75° C. for 15 seconds, filled into plastic bottles (1 litre) and stored at 4° C. for 7 days. It was then assessed for functional and sensory characteristics as follows:

Fortified milk and un-fortified control milk had no difference in colour as measured by Minolta. Sensory assessment found no difference in colour or taste between the fortified and control products.

Tea: a tea bag was brewed for 4 min in 180 ml boiling water. 20 ml cold milk was added and stirred. Sensory assessment found no difference in colour or taste between the tea made with the fortified or un-fortified control milk.

Dark coffee: 2 scoops ground plunger coffee was brewed for 2 min in 300 g boiling water. 20 g of this brewed coffee was then added to 50 g boiling milk. Sensory assessment found no difference in taste between the dark coffee made with the fortified or un-fortified control milk. However, there was a significant change in colour between the two milks, with the fortified milk causing the coffee to turn a dark grey.

Milky coffee: 2 scoops ground plunger coffee was brewed for 2 min in 300 g boiling water. 20 g of this brewed coffee was then added to 100 g boiling milk. Sensory assessment found no difference in taste between the milky coffee made with the fortified or un-fortified control milk. However, there was a significant change in colour between the two milks, with the fortified milk causing the coffee to turn a dark grey.

In an additional study, the reconstituted WMP was UHT processed at 140° C. for 5 seconds, filled into plastic bottles (1 litre) and stored at 4° C. for 7 days. Sensory testing on the milk showed a small difference in taste between the fortified and un-fortified control products, but this was not rated as an unpleasant difference. There was no difference in colour. The fortified product could also be added to tea and dark coffee without any differences in taste, although there was a small negative effect on the taste of milky coffee. There were significant colour differences in the coffee products.

Separately, chocolate mix (Nestle Nesquik) was added to the reconstituted WMP at a concentration of 6 g Nesquik in 100 g milk. The chocolate-flavored milks were then pasteurized at 75° C. for 15 seconds, filled into plastic bottles (1 litre) and stored at 4° C. for 2 days. Sensory assessment showed a small but acceptable change in colour and no difference in flavor between the fortified and un-fortified control milks. In addition, the chocolate-flavored milks were UHT processed at 140° C. for 5 seconds, filled into plastic bottles (1 litre) and stored at 4° C. for 2 days. Sensory assessment showed a noticeable but acceptable change in colour and no significant difference in flavor between the fortified and un-fortified control milks.

Example 8: Heat Stability and Sensory Analysis of Complex II

An iron-protein complex according to "Complex II" was added to whole milk powder (WMP) at a level equivalent to 37.5 mg iron per 100 g WMP. This was then reconstituted to 12% solids using water, equivalent to natural milk. This provided a final iron concentration of 4.5 mg per 100 ml serving, equivalent to 25% of the RDA for menstruating women or 56% of the RDA for adult males and postmenopausal women.

The reconstituted WMP was then pasteurized at 75° C. for 15 seconds, filled into plastic bottles (1 litre) and stored at 4° C. for 7 days. It was then assessed for functional and sensory characteristics as follows:

Fortified milk and un-fortified control milk had no difference in colour as measured by Minolta. Sensory assessment found no difference in colour or taste between the fortified and control products.

Tea: a tea bag was brewed for 4 min in 180 ml boiling water. 20 ml cold milk was added and stirred. Sensory assessment found no difference in colour or taste between the tea made with the fortified or un-fortified control milk.

Dark coffee: 2 scoops ground plunger coffee was brewed for 2 min in 300 g boiling water. 20 g of this brewed coffee was then added to 50 g boiling milk. Sensory assessment found no difference in colour or taste between the dark coffee made with the fortified or un-fortified control milk.

Milky coffee: 2 scoops ground plunger coffee was brewed for 2 min in 300 g boiling water. 20 g of this brewed coffee was then added to 100 g boiling milk. Sensory assessment found no difference in taste between the milky coffee made with the fortified or un-fortified control milk. There was only a very slight difference in colour between the products, but this was not noticeable unless they were directly compared.

In an additional study, the reconstituted WMP was UHT processed at 140° C. for 5 seconds, filled into plastic bottles (1 litre) and stored at 4° C. for 7 days. Sensory testing on the milk showed a small difference in taste between the fortified and un-fortified control products, but this was not rated as an unpleasant difference. There was no difference in colour. The fortified product could also be added to tea, milky coffee and dark coffee without any differences in taste, although there were significant colour differences in the coffee products.

Separately, chocolate mix (Nestle Nesquik) was added to the reconstituted WMP at a concentration of 6 g Nesquik in 100 g milk. The chocolate-flavored milks were then pasteurized at 75° C. for 15 seconds, filled into plastic bottles (1 litre) and stored at 4° C. for 2 days. Sensory assessment showed a small but acceptable change in colour and no difference in flavor between the fortified and un-fortified control milks. In addition, the chocolate-flavored milks were UHT processed at 140° C. for 5 seconds, filled into plastic bottles (1 litre) and stored at 4° C. for 2 days. Sensory assessment showed a noticeable but acceptable change in colour and no significant difference in flavor between the fortified and un-fortified control milks.

What we claim is:

1. A soluble mineral-protein complex comprising:
calcium;
milk protein comprising casein in the form found in milk;
a mineral selected from the group consisting of iron, zinc, copper, manganese, magnesium, selenium and chromium; and
orthophosphorus,
wherein a ratio of the milk protein to the calcium is at least 45:1,
wherein the mineral is bound to the casein in the form found in milk,
wherein the mineral bound to the casein in the form found in milk is greater than 1 wt. % of the soluble mineral-protein complex,
wherein the casein and the orthophosphorus are in a weight ratio between 32:1 and 6.25:1.

2. The soluble mineral-protein complex of claim 1, wherein the mineral is iron.

3. The soluble mineral-protein complex of claim 2, wherein the iron is ferric iron.

4. The soluble mineral-protein complex milk product of claim 1, wherein the mineral bound to the casein in the form found in milk is between 1 wt. % to 20 wt.% of the soluble mineral-protein complex.

5. The soluble mineral-protein complex of claim 1, wherein the mineral bound to the casein in the form found in milk is between 1 wt. % to 9 wt. % of the soluble mineral-protein complex.

6. A method of manufacturing a soluble mineral-protein complex including:
calcium;
milk protein comprising casein in the form found in milk;
a mineral selected from the group consisting of iron, zinc, copper, manganese, magnesium, selenium and chromium; and orthophosphorus,
wherein a ratio of the milk protein to the calcium is at least 45:1,
wherein the mineral is bound to the casein in the form found in milk,
wherein the mineral bound to the casein in the form found in milk is greater than 1 wt. % of the soluble mineral-protein complex,
wherein the casein and the orthophosphorus are in a weight ratio between 32:1 and 6.25:1;
wherein the soluble mineral-protein complex is soluble in a solution at a physiological pH between 6.6 to 6.9,
the method comprising:
a) adding the orthophosphorus to the milk protein; and
b) adding the exogenous mineral to the milk protein to form the soluble mineral-protein complex.

7. The method as claimed in claim 6, wherein the casein is provided by at least one compound selected from the group consisting of sodium caseinate, potassium caseinate, ammonium caseinate, lactic casein, derivatives of caseins, and fractions of caseins.

8. The method as claimed in claim 6, wherein the method comprises dissolving the milk protein in water to form a solution.

9. The method as claimed in claim 8, wherein the milk protein concentration in the solution is between 1-12.5% w/v.

10. The method as claimed in claim 8, wherein the orthophosphorus is added to the solution prior to the addition of the mineral.

11. The method as claimed in claim 6, wherein the orthophosphorus is provided by $K_2HPO_4$.

12. The method as claimed in claim 8, wherein an amount of orthophosphorus is added to the solution such that the ratio of the milk protein to the orthophosphorus is between 5:1 to 130:1.

13. The method as claimed in claim 6, wherein the ratio of the milk protein to the orthophosphorus is between 7:1 to 90:1.

14. The method as claimed in claim 6, wherein the mineral is added to the mixture resulting from step a).

15. The method as claimed in claim 6, wherein the mineral is iron.

16. The soluble mineral-protein complex of claim 1, wherein the ratio of the milk protein to the calcium is equal to or greater than 58:1.

17. The soluble mineral-protein complex of claim 1, wherein the soluble mineral-protein complex is made by a process comprising removing at least 70 wt. % of the calcium from milk comprising the milk protein.

18. The soluble mineral-protein complex of claim 1, wherein the ratio of the milk protein to the calcium is between 70:1 and 95:1.

19. The soluble mineral-protein complex of claim 1, wherein the mineral bound to the casein is 4 wt. % to 8 wt. % of the soluble mineral-protein complex.

* * * * *